United States Patent [19]

Van Laningham

[11] 4,445,606
[45] May 1, 1984

[54] ARMATURE ASSEMBLY FOR ELECTROMAGNETIC COUPLING

[75] Inventor: Kalvin G. Van Laningham, Rockton, Ill.

[73] Assignee: Warner Electric Brake & Clutch Company, South Beloit, Ill.

[21] Appl. No.: 330,610

[22] Filed: Dec. 14, 1981

[51] Int. Cl.³ .................... F16D 47/02; F16D 27/00
[52] U.S. Cl. ............... 192/106.1; 192/84 C;
403/2; 403/11; 403/226; 403/359; 464/31; 464/75
[58] Field of Search ............ 192/106.1, 84 C, 55, 192/70.17, 82 T, 109 R, 70.15; 403/2, 11, 359, 372, 226; 464/75, 17, 31, 32; 248/544

[56]  References Cited
U.S. PATENT DOCUMENTS

| 1,803,937 | 5/1931 | Jansson | 192/106.1 |
| 1,912,703 | 6/1933 | Gamble | 192/106.1 |
| 1,919,484 | 7/1933 | Saurer | 248/544 X |
| 2,106,737 | 2/1938 | Haire | 403/226 |
| 3,044,594 | 7/1962 | Bernard | 192/84 C |
| 3,705,701 | 12/1972 | Hunt | 248/544 |
| 3,752,279 | 8/1973 | Briar | 192/84 C |
| 3,774,739 | 11/1973 | Higuchi | 192/84 C |
| 3,889,789 | 6/1975 | Boehringer | 464/31 X |
| 4,142,701 | 3/1979 | Fujii et al. | 248/544 |
| 4,160,498 | 7/1979 | Newton et al. | 192/84 C |
| 4,187,939 | 2/1980 | Silverstrini et al. | 192/84 C |
| 4,296,907 | 10/1981 | Ishida et al. | 248/544 X |

FOREIGN PATENT DOCUMENTS 2733880 2/1978 Fed. Rep. of Germany ... 192/106.1

OTHER PUBLICATIONS

Brochure of Ogura Clutch Co., Ltd. entitled "Clutches for Mobile Air Conditioning".

Primary Examiner—Rodney H. Bonck
Assistant Examiner—David D. House
Attorney, Agent, or Firm—Leydig, Voit, Osann, Mayer & Holt, Ltd.

[57] ABSTRACT

An armature of an electromagnetic clutch is connected to a mounting plate which is coupled to the toothed driven hub of the clutch through the intermediary of an elastomeric spider. If the spider is melted by heat, the mounting plate wedges against the tips of the teeth of the hub and is prevented from flying axially off of the forward end of the hub.

9 Claims, 9 Drawing Figures

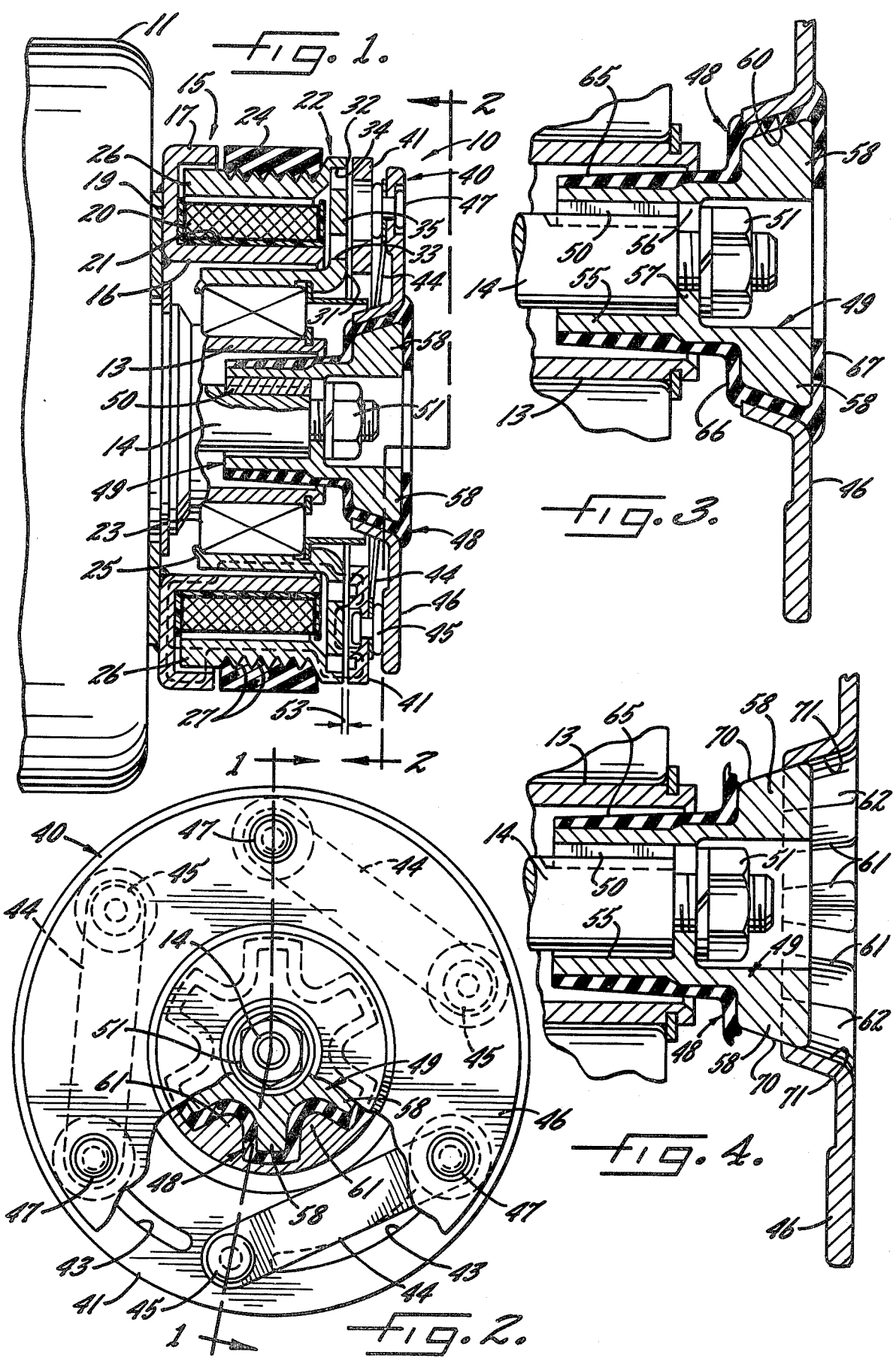

ARMATURE ASSEMBLY FOR ELECTROMAGNETIC COUPLING

BACKGROUND OF THE INVENTION

This invention relates to an armature assembly for an electromagnetic coupling such as an electromagnetic clutch. In such a clutch, an armature is connected to a driven hub by a mounting plate and is adapted to be coupled to a driving rotor when an electromagnet is excited to engage the clutch. When the clutch is engaged, the rotor acts through the armature and the mounting plate to rotate the driven hub.

In order to dampen torsional shock and vibration, the armature mounting plate is connected to the driven hub by an elastomeric ring or spider disposed between the plate and the hub. An electromagnetic clutch with an elastomeric ring or spider is disposed in Silvestrini et al. U.S. Pat. No. 4,187,939.

Difficulty has been encountered with prior electromagnetic clutches having elastomeric spiders in that, under certain abnormal conditions, the clutch may be subjected to extremely high heat. The heat melts the spider and destroys the connection between the mounting plate and the driven hub. As a result, the mounting plate and the armature may fly axially off of the hub and cause either damage or injury.

SUMMARY OF THE INVENTION

The general aim of the present invention is to provide a new and improved armature assembly in which the mounting plate and the driven hub are uniquely constructed so as to be comparatively compact in an axial direction and, at the same time, to coact with one another to prevent the plate from flying off the hub in the event the elastomeric spider is destroyed.

A more detailed object is to achieve the foregoing by providing an armature assembly in which the mounting plate is splined to the driven hub through the intermediary of the spider and, in the event the spider is destroyed, is captivated on the hub by virtue of a unique wedging action between the hub and the mounting plate.

In brief, the invention resides in the provision of an armature assembly in which spline teeth on the mounting plate are drivingly coupled to spline teeth on the driven hub by an elastomeric spider and in which the mounting plate wedges against and is captivated axially by the teeth on the hub if the spider is destroyed.

These and other objects and advantages of the invention will become more apparent from the following detailed description when taken in conjunction with the accompanying drawings.

BRIEF DESCRIPTION OF THE DRAWINGS

FIG. 1 is a sectional view of a typical electromagnetic coupling equipped with a new and improved armature assembly incorporating the unique features of the present invention, the view being taken substantially along the line 1—1 of FIG. 2.

FIG. 2 is an enlarged fragmentary cross-section taken substantially along the line 2—2 of FIG. 1.

FIG. 3 is an enlarged view of parts shown in FIG. 1.

FIG. 4 is a view similar to FIG. 3 but shows the mounting plate in a moved position after destruction of the spider.

DETAILED DESCRIPTION OF THE PREFERRED EMBODIMENT

Figure 5:
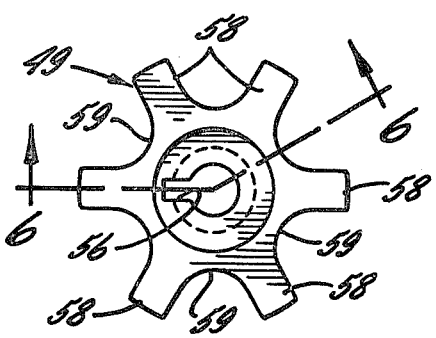
FIG. 5 is an end view of the forward end of the driven hub.

For purposes of illustration, the present invention is shown in connection with an electromagnetic coupling 10 which herein is in the form of an electromagnetic clutch. The clutch 10 is shown as being used in conjunction with an automobile air conditioning compressor 11 having a tubular nose 13 for mounting the clutch and having a drive shaft 14 which extends through the nose.

The clutch 10 includes an electromagnet which is formed in part by an annular magnet core 15 of substantially J-shaped radial cross-section and having an inner pole ring 16 and an outer pole ring 17. Formed integrally with and extending radially between the rear ends of the two pole rings is a bridge 19 which is rigidly secured to the end of the compressor 11. A multiple turn winding 20 is secured within a U-shaped channel 21 which, in turn, is fastened to the outer side of the inner pole ring 16. Reference may be made to Newton et al. U.S. Pat. No. 4,160,498 for a more detailed disclosure of the magnet core 15.

An annular rotor 22 is rotatably journaled on the nose 13 of the compressor 11 by a bearing 23 and is adapted to be driven from the engine of the vehicle by an endless belt 24. The rotor is substantially U-shaped in radial cross-section and includes inner and outer concentric annular pole pieces 25 and 26 made of magnetic material, the inner pole piece being secured to the outer race of the bearing. Several axially spaced grooves 27 extend circumferentially around the outer side of the outer pole piece 26 and interfit with complemental ribs on the inner side of the drive belt. Accordingly, the outer pole piece defines a pulley for the belt.

The inner pole piece 25 of the rotor 22 is spaced inwardly from the inner pole ring 16 of the magnet core 15 while the outer pole piece 26 of the rotor is located between and is spaced from the winding 20 and the outer pole ring 17 of the core. When the winding 20 is excited by a voltage source, magnetic flux is produced and threads through the core and the rotor and across the various gaps between the pole rings and the pole pieces. The nature of the controlled flux transfer between the core and the rotor is explained in more detail in the aforementioned Newton et al. patent.

Pole faces 31 and 32 are defined by the forward ends of the pole pieces 25 and 26, respectively. The pole faces are magnetically isolated from one another by radially spaced sets 33 and 34 of angularly spaced arcuate slots but are physically connected by an intervening ring 35 located between the two sets of slots.

Located in opposing relation to the pole faces 31 and 32 is an armature assembly 40. Herein, the armature assembly includes an armature 41 in the form of a circular disc made of magnetic material and having a series of angularly spaced and arcuate slots 43 (FIG. 2) located between its inner and outer sides. Three leaf springs 44 are spaced angularly around and extend generally chordwise of the armature. One end of each spring is connected to the armature by a rivet 45 while the other end of each spring is connected to an annular metallic mounting plate or bumper plate 46 by a rivet 47. The bumper plate is located forwardly of the armature. An elastomeric spider 48 couples the bumper plate to rotate in unison with a hub unit 49. The hub unit is keyed to the compressor shaft 14 at 50 (FIG. 3) and is clamped in an axially fixed position on the shaft by a nut 51 which is threaded onto the shaft.

The springs 44 couple the armature 41 for rotation in unison with the bumper plate 46, the spider 48 and the hub unit 49 and urge the armature away from the pole faces 31 and 32 of the magnet rotor 22. When the winding 20 is not excited, a narrow axial air gap 53 (FIG. 1) exists between the armature and the poles faces. Upon excitation of the winding, the flux cuts across the gap 53 to draw the armature 41 into frictional engagement with the pole faces 31 and 32 and thereby couple the armature and the rotor for rotation in unison. The shaft 14 thus is rotated by way of the leaf springs 44, the bumper plate 46, the elastomeric spider 48 and the hub unit 49. The purpose of the elastomeric spider is to absorb torsional shock when the armature 41 initially engages the pole faces 31 and 32 and to dampen torsional vibration during rotation of the shaft 14.

If the compressor 11 malfunctions, the shaft 14 may lock against rotation. Under such circumstances, the armature 41 slips relative to the rotor 22 and generates heat of extremely high temperature. If present for a sufficient length of time, the heat melts the elastomeric spider 48 and thus destroys the connection between the bumper plate 46 and the hub unit 49. With certain prior armature assemblies, the bumper plate and the armature fly axially off of the hub unit when the connection provided by the spider is destroyed. The free bumper plate and armature may fly into the automobile's fan or radiator and may possibly cause personal injury.

In accordance with the present invention, the bumper plate 46 and the hub unit 49 are uniquely constructed so as to cause the bumper plate to wedge axially against the hub unit if the spider 48 is destroyed. As a result of the wedging action, the bumper plate is captivated axially on the hub unit and is prevented from flying off of the hub unit even if the spider is completely melted.

Figure 6:
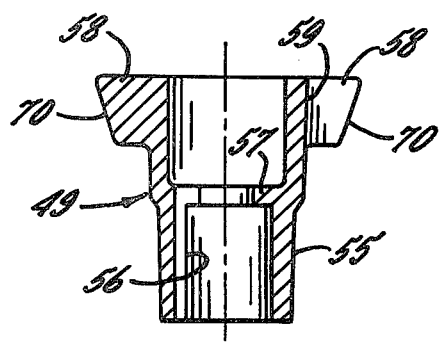
FIG. 6 is a cross-section taken substantially along the line 6—6 of FIG. 5.
Figure 7:
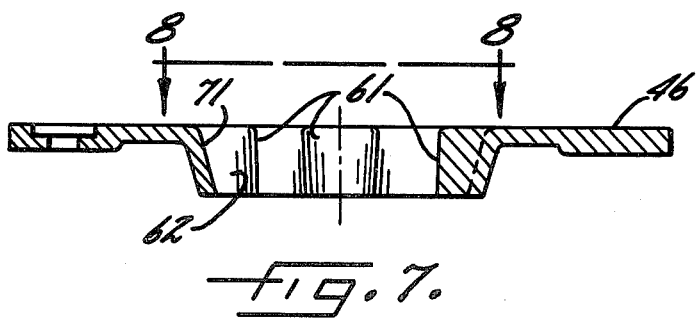
FIG. 7 is a sectional view of the mounting plate.

More specifically, the present hub unit 49 is die cast from metal and comprises a sleeve 55 (FIG. 6) adapted to telescope over the compressor shaft 14. The sleeve is formed with an internal keyway 56 and also is formed with an internal annular shoulder 57 adapted to be clamped against the end of the shaft 14 by the nut 51. Formed integrally with the outer end of the sleeve 55 are several outwardly projecting and circumferentially spaced teeth 58 (FIG. 5) which are separated from one another by circumferentially spaced valleys 59.

Figure 8:
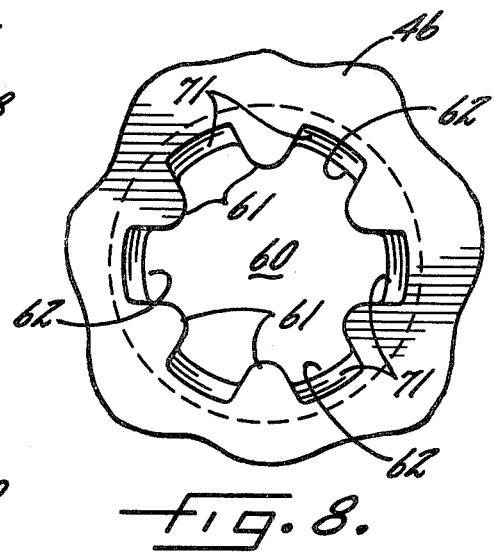
FIG. 8 is a fragmentary view taken along the line 8—8 of FIG. 7.

A hole 60 (FIG. 8) is formed through the center of the bumper plate 46 and its periphery is defined by a series of inwardly projecting and circumferentially spaced teeth 61 which are separated from one another by angularly spaced valleys 62. The bumper plate also is die cast from metal. The forward end of the hub unit 49 is adapted to telescope into the hole 60 in the bumper plate 46 with the teeth 58 of the hub unit spaced radially and circumferentially from the valleys 62 of the plate and with the teeth 61 of the plate spaced radially and circumferentially from the valleys 59 of the hub unit. The radial and circumferential spaces between the various teeth and valleys are filled with the elastomeric material of the spider 48. Such material prevents metal-to-metal contact between the bumper plate 46 and the hub unit 49 and cushions torsional shock and vibration.

Figure 9:
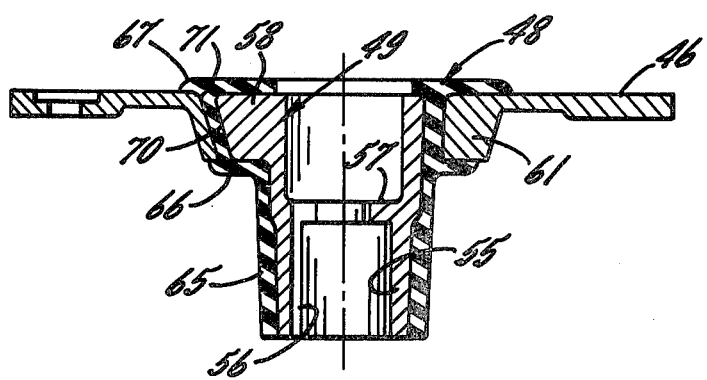
FIG. 9 is a sectional view of the mounting plate, the spider and the driven hub.

In this instance, the spider 48 is molded in place by an injection molding process after the forward end of the hub unit 49 has been telescoped into the hole 60 in the bumper plate 46. As an incident to the molding, the elastomeric material flows into and fills the radial and circumferential spaces between the various teeth 58 and 61 and valleys 59 and 62. In addition, the spider is molded with a sleeve 65 (FIG. 9) which encircles and embraces the sleeve 55 of the hub unit 49, with a rear radial flange 66 (FIGS. 3 and 9) which engages the rear sides of the bumper plate and the teeth 58 and with a forward radial flange 67 which engages the forward sides of the bumper plate and the hub unit. Upon solidifying, the elastomeric material becomes bonded to the metal surfaces of the bumper plate and the hub unit. As long as the spider 48 is intact, the bond between the elastomeric material and the metal captivates the bumper plate 46 against moving axially relative to the hub unit 49.

In carrying out the invention, the bumper plate 46 and the hub unit 49 are uniquely shaped to cause the bumper plate to wedge outwardly against and to be captivated axially by the hub unit in the event the spider 48 melts and is no longer capable of axially restraining the bumper plate. Herein, this is achieved by shaping the tips 70 (FIGS. 4 and 6) of the teeth 58 of the hub unit 49 such that the tips flare radially outwardly as the tips progress forwardly. In addition, the bottoms 71 (FIGS. 4, 8 and 9) of the valleys 62 in the plate 46 are shaped so as to flare radially outwardly at the same angle as the tips as the bottoms progress forwardly. With this arrangement, the bottoms 71 of the valleys 62 wedge against the tips 70 of the teeth 58 as shown in FIG. 4 if the spider 48 is destroyed and the bumper plate 46 shifts forwardly along the hub unit 49. Such wedging prevents further forward movement of the bumper plate and thus prevents the plate from flying forwardly off of the hub unit. In spite of the forward wedging action which is obtained, the bumper plate may be easily assembled with the hub unit prior to molding of the spider by telescoping the bumper plate over the hub unit from the rear thereof.

From the foregoing, it will be apparent that the present invention brings to the art a new and improved armature assembly 40 which is mechanically restrained as a result of the wedging action between the bumper plate 46 and the hub unit 49. In addition, the armature assembly is relatively compact in an axial direction by virtue of the toothed spider 48 being nested radially between the toothed bumper plate and the toothed hub unit.

I claim:

1. An armature assembly for an electromagnetic coupling, said assembly comprising a forwardly disposed mounting plate and a rearwardly disposed armature, means connecting said armature and said plate for rotation in unison while permitting said armature to move toward and away from said plate, a hole extending axially through said plate, the periphery of said hole being defined by a first set of circumferentially spaced teeth and by a first set of circumferentially spaced valleys which alternate with the teeth, a hub having a second set of circumferentially spaced teeth and having a second set of circumferentially spaced valleys which alternate with the second teeth, said hub being telescoped into said hole with the teeth of each set being disposed within the valleys of the other set, elastomeric material disposed between said first and second teeth and coupling said plate and said hub for rotation in unison, the tips of the teeth of one of said sets and the bottoms of the valleys of the other of said sets being shaped so as to be engageable with one another with a wedging action upon forward shifting of said plate relative to said hub thereby to captivate said plate against forward separation from said hub.

2. An armature assembly as defined in claim 1 in which the tips of the teeth of said hub are shaped so as to flare outwardly as said tips progress forwardly.

3. An armature assembly as defined in claim 1 in which the bottoms of the valleys of said plate are shaped so as to flare outwardly as said bottoms progress forwardly.

4. An armature assembly as defined in claim 2 in which the bottoms of the valleys of said plate are shaped so as to flare outwardly as said bottoms progress forwardly.

5. An armature assembly as defined in claim 4 in which said flared tips extend substantially parallel to said flared bottoms.

6. An armature assembly as defined in either of claims 1 or 5 in which the teeth of each set are spaced circumferentially and radially from the valleys of the other set, said elastomeric material comprising a spider which fills the circumferential and radial spaces between the teeth and the valleys, said spider having first integral flange means which engage the forward sides of said plate and said hub and having second integral flange means which engage the rear sides of said plate and said hub.

7. An armature assembly for an electromagnetic coupling, said assembly comprising a forwardly disposed mounting plate and a rearwardly disposed armature, means connecting said armature and said plate for rotation in unison while permitting said armature to move toward and away from said plate, a hole extending axially through said plate, the periphery of said hole being defined by a first set of circumferentially spaced teeth and by a first set of circumferentially spaced valleys which alternate with the teeth, a hub having a second set of circumferentially spaced teeth and having a second set of circumferentially spaced valleys which alternate with the second teeth, said hub being telescoped into said hole with the teeth of each set being disposed within the valleys of the other set, elastomeric material disposed between said first and second teeth and coupling said plate and said hub for rotation in unison, the tips of the teeth of said hub and the bottoms of the valleys of said plate flaring outwardly upon progressing forwardly and being engageable with one another with a wedging action upon forward shifting of said plate relative to said hub thereby to captivate said plate against forward separation from said hub.

8. An armature assembly as defined in claim 7 in which said flared tips extend substantially parallel to said flared bottoms.

9. An armature assembly as defined in either of claims 7 or 8 in which the teeth of each set are spaced circumferentially and radially from the valleys of the other set, said elastomeric material comprising a spider which fills the circumferential and radial spaces between the teeth and the valleys, said spider having first integral flange means which engage the forward sides of said plate and said hub and having second integral flange means which engage the rear sides of said plate and said hub.

* * * * *